(12) United States Patent
Meng et al.

(10) Patent No.: US 8,225,029 B2
(45) Date of Patent: Jul. 17, 2012

(54) DATA STORAGE PROCESSING METHOD, DATA SEARCHING METHOD AND DEVICES THEREOF

(75) Inventors: Xiaofeng Meng, Shenzhen (CN); Xing Rao, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 432 days.

(21) Appl. No.: 12/689,712

(22) Filed: Jan. 19, 2010

(65) Prior Publication Data

US 2010/0185807 A1 Jul. 22, 2010

(30) Foreign Application Priority Data

Jan. 19, 2009 (CN) .......................... 2009 1 0036731

(51) Int. Cl.
*G06F 13/00* (2006.01)
(52) U.S. Cl. .......................... 711/103; 711/154; 711/163
(58) Field of Classification Search .................. 711/103, 711/154, 163
See application file for complete search history.

(56) References Cited

U.S. PATENT DOCUMENTS 7,548,928 B1 * 6/2009 Dean et al. ............................ 1/1
2010/0174853 A1 * 7/2010 Lee et al. ...................... 711/103

FOREIGN PATENT DOCUMENTS

EP 1 988 474 A1 11/2008
WO 00/54184 9/2000

OTHER PUBLICATIONS

Yin, Shaoyi et al. "PB Filter: Indexing Flash-Resident Data through Partitioned Summaries" Institut National De Recherche En Informatique Et En Automatique. Jun. 4, 2008:1-21.
Hsieh, Jen-Wei et al. "Efficient On-line Identification of Hot Data for Flash-Memory Management" ACM Symposium on Applied Computing. Mar. 13-17, 2005:838-842.
European Search Report issued in corresponding European Patent Application No. 10 15 0977; issued Mar. 31, 2010.
Communication issued in corresponding European Patent Application No. 10150977.6, mailed Dec. 6, 2010.

* cited by examiner

*Primary Examiner* — Reba I Elmore
(74) *Attorney, Agent, or Firm* — Brinks Hofer Gilson & Lione

(57) ABSTRACT

A data storage processing method, a data searching method, and devices thereof are provided. The data storage processing method includes: sequentially writing data to a data recording area in a flash; generating log information according to a physical address of the data in the data recording area and an identifier (ID) of the data, and sequentially writing the log information to a log area in the flash; and constructing a Bloom filter data for the log information in the log area, and sequentially writing the Bloom filter data to a log digest area in the flash. A flash storage structure including the data recording area, the log area, and the log digest area is adopted, thereby reducing the occupied storage space of the flash. In addition, since all the areas adopt a sequential storage mode, the data maintenance is quite simple.

12 Claims, 6 Drawing Sheets

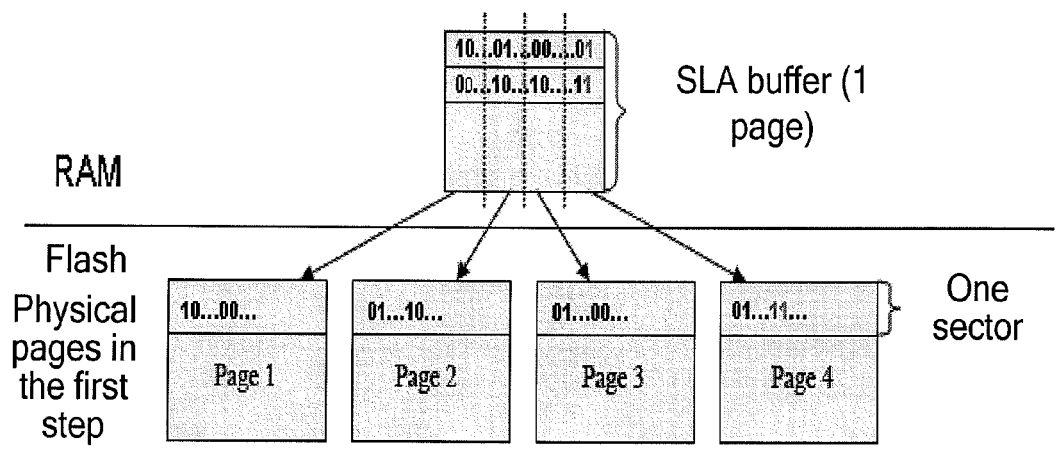
FIG. 2.1

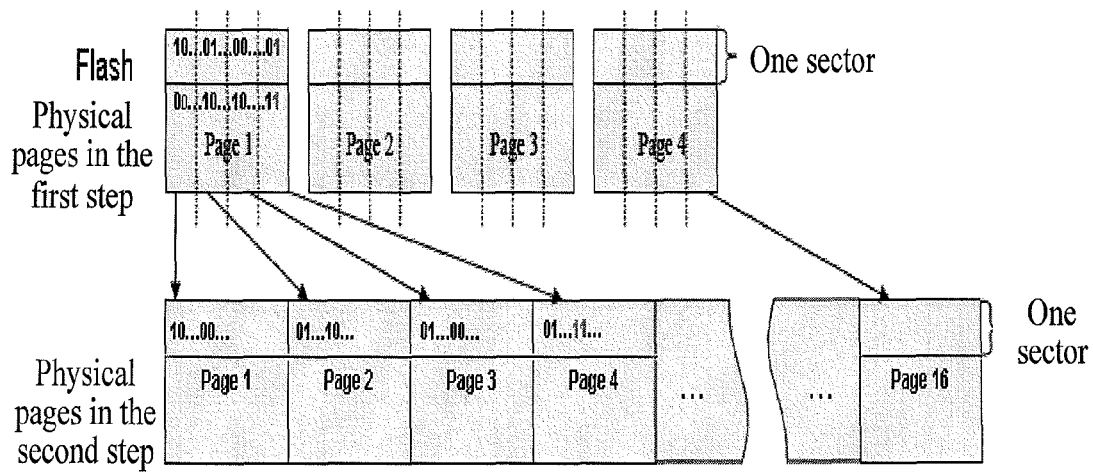
FIG. 2.2
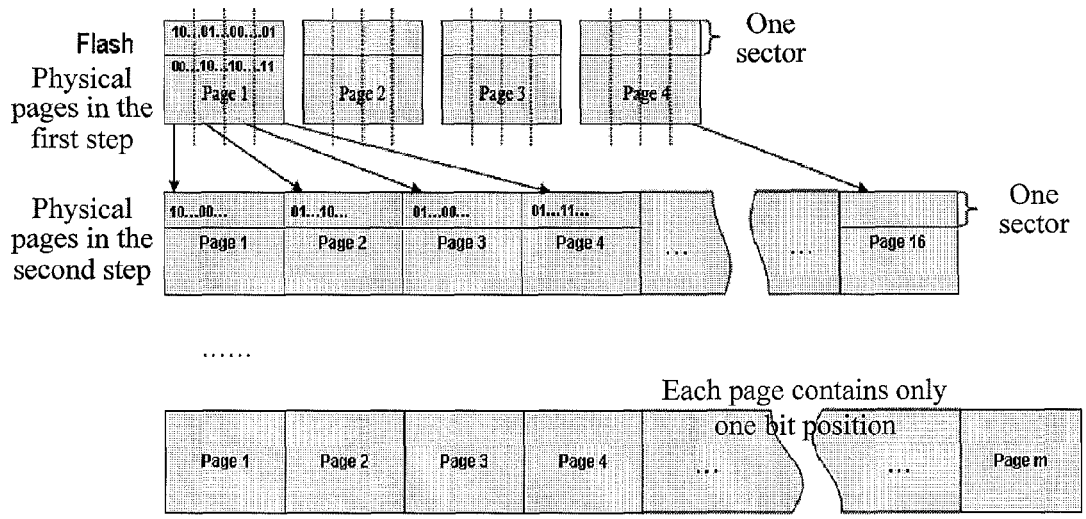
FIG. 2.3

DATA STORAGE PROCESSING METHOD, DATA SEARCHING METHOD AND DEVICES THEREOF

CROSS-REFERENCE TO RELATED APPLICATION

This application claims priority to Chinese Patent Application No. 200910036731.0, filed on Jan. 19, 2009, which is hereby incorporated by reference in its entirety.

FIELD OF THE INVENTION

The present disclosure relates to the communication field, and more particularly to a data storage processing method, a data searching method, and devices thereof.

BACKGROUND OF THE INVENTION

In recent years, with the development of manufacturing technologies, flash memories gradually play an important role in the memory market due to an increasingly low cost and increasingly high storage capacity and density, and have developed in the trend of becoming a main online storage medium in place of magnetic disks. Since the working principle of a flash is completely different from that of a magnetic disk, the existing storage system cannot effectively work on the flash, and cannot be executed unless the flash is packaged as a block device like the magnetic disk by using certain intermediate mapping techniques. What is worse, the process makes the working efficiency rather low, and as a result, the fast reading/writing characteristics of the flash cannot be fully utilized. The emergence of high-capacity flash memories brings hopes for performing data storage and searching operations in a high efficient, and also causes unprecedented challenges to the implementation of highly efficient data storage technologies.

Currently, a journal flash file system (JFFS) has been proposed, and the latest version JFFS3 adopts a B+ tree as an index structure. In JFFS3, a newly inserted or updated original data record is directly marked as a log, and a small B+ tree structure is maintained in a memory, so as to improve the searching efficiency of the records in the log area. After a buffer of the memory is full, the B+ tree in the flash is updated, and meanwhile, data records in the log area are converted as normal data records, and afterwards, a subsequently inserted record turns to become a new log record, and a new temporal index is correspondingly maintained in the memory for the log record, and the process is repeatedly performed, which aims at updating logs in batches by delaying the update of the B+ tree structure.

In fact, the principle of the JFFS algorithm is to delay the update of the B+ tree structure by using logs, so as to combine a plurality of flash write operations into one write operation. However, the reduction in the number of flash write operations does not mean enhancing the data writing efficiency. In addition, the algorithm needs to occupy a large flash space, and has complex data maintenance operations.

SUMMARY OF THE INVENTION

Accordingly, the embodiments of the present invention provide a data storage processing method and a data storage processing device, a data searching method and a data searching device, which are applicable to reduce the occupied storage space of the flash, and to implement simple data maintenance and highly efficient data searching.

In an embodiment, a data storage processing method is provided, which includes the following steps.

Data is sequentially written to a data recording area in a flash.

Log information is generated according to a physical address of the data in the data recording area and an identifier (ID) of the data, and sequentially written to a log area in the flash.

A Bloom filter data is constructed for the log information in the log area, and sequentially written to a log digest area in the flash.

Correspondingly, in an embodiment, a data storage processing device is provided, which includes a record processing unit, a log processing unit, and a log digest processing unit.

The record processing unit is adapted to sequentially write data to a data recording area in a flash.

The log processing unit is adapted to generate log information according to a physical address of the data in the data recording area and an ID of the data, and sequentially write the log information to a log area in the flash.

The log digest processing unit is adapted to construct a Bloom filter data for the log information in the log area, and sequentially write the Bloom filter data to a log digest area in the flash.

Correspondingly, in an embodiment, a data searching method corresponding to the data storage processing method is provided, which includes the following steps.

A Bloom filter data in a log digest area in a flash is searched according to an ID of data, and a position of log information corresponding to the ID of the data in a log area is determined according to the obtained Bloom filter data.

The log information containing the ID of the data is searched in the log area according to the determined position, and a physical address in the log information is obtained.

The physical address is taken as an index to acquire the data from a corresponding physical address in a data recording area in the flash.

Correspondingly, in an embodiment, a data searching device is provided, which includes a digest search unit, a log search unit, and a data search unit.

The digest search unit is adapted to search a Bloom filter data in a log digest area in a flash according to an ID of data, and determine a position of log information corresponding to the ID of the data in a log area according to the obtained Bloom filter data.

The log search unit is adapted to search the log information containing the ID of the data in the log area according to the determined position, and obtain a physical address in the log information.

The data search unit is adapted to take the physical address as an index to acquire the data from a corresponding physical address in a data recording area in the flash.

In the embodiments of the present invention, a flash storage structure including a data recording area, a log area, and a log digest area is adopted, thereby reducing the occupied storage space of the flash. In addition, since all of the areas adopt a sequential storage mode, the data maintenance is quite simple. Meanwhile, as the log digest is stored in a form of Bloom filter data, the data query efficiency is improved.

BRIEF DESCRIPTION OF THE DRAWINGS

FIG. 2.1 is a schematic view of a stage in an operation of writing data to a log digest area according to an embodiment the present invention;

FIG. 2.2 is a schematic view of another stage in the operation of writing data to a log digest area according to an embodiment the present invention;

FIG. 2.3 is a schematic view of another stage in the operation of writing data to a log digest area according to an embodiment the present invention;

DETAILED DESCRIPTION OF THE INVENTION

The technical solutions of the present invention are clearly and completely described below with reference to the accompanying drawings. Apparently, the embodiments described as follows are only a part of the embodiments of the present invention rather than all of the embodiments of the present invention. All other embodiments obtained by persons skilled in the art based on the embodiments of the present invention without creative efforts should fall within the protection scope of the present invention.

Figure 1:
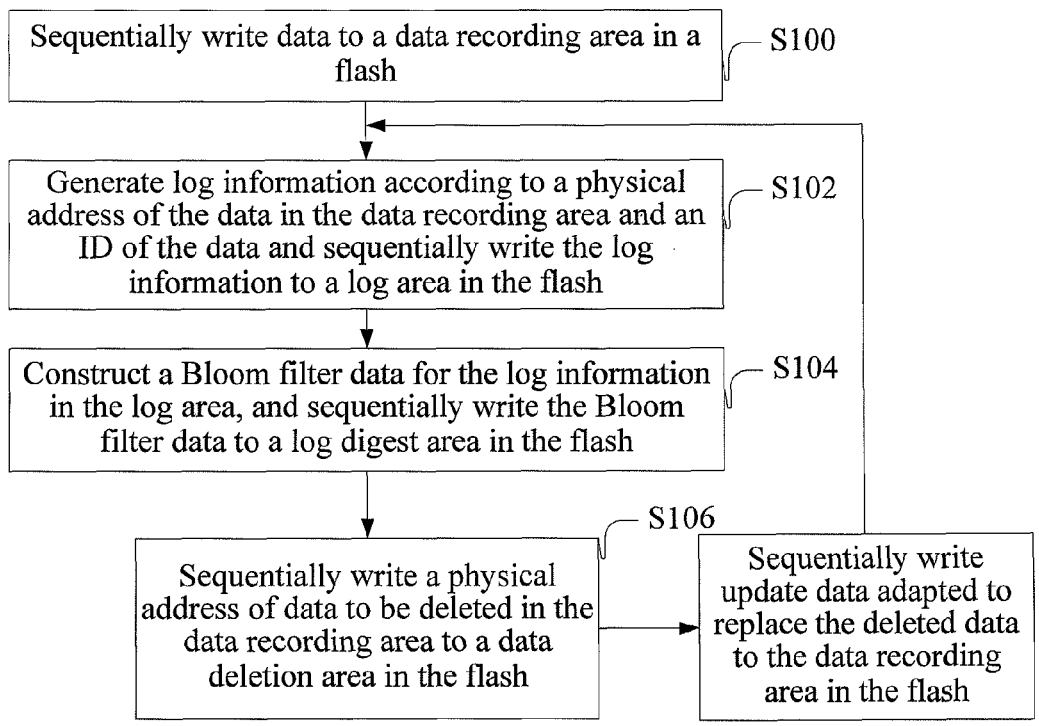
FIG. 1 is a schematic flow chart of a data storage processing method according to an embodiment of the present invention.

In an embodiment, a data storage processing method is provided. FIG. 1 is a schematic flow chart of a data storage processing method according to a first embodiment of the present invention. Referring to FIG. 1, the method of this embodiment mainly includes the following steps.

In step S100, data is sequentially written to a data recording area in a flash. The sequential writing operation means that newly written data is sequentially stored in a position following the end of the previous data, and after data is stored at the last address of a data area, subsequent data is further stored at the first address of the data area. Specifically, in step S100, when the data is written to the data recording area in the flash, the data is firstly written to a buffer page in a memory corresponding to the data recording area, and when the buffer page in the memory is full, contents of the buffer page are written to the data recording area in the flash.

In step S102, log information is generated according to a physical address of the data in the data recording area and an ID of the data, and the log information is sequentially written to a log area in the flash. The physical address refers to an address of a physical page in the data recording area where the data is stored, which may be used to find the data in a data searching process. The ID of the data is adapted to uniquely identify the data, and specifically, the ID of the data may be a key value. If Rec represents a data, Addr represents a physical address of the data in the data recording area, and Key represents a key value of the data, the log information may be expressed as <R.Key, R.Addr>. Correspondingly, in step S102, when the log information is sequentially written to the log area in the flash, the log information is firstly written to a buffer page in the memory corresponding to the log area, and when the buffer page in the memory is full, the contents of the buffer page are written to the log area in the flash. Specifically, the log information exists in the log area in the form of a log page.

In step S104, a Bloom filter data is constructed for the log information in the log area, and the Bloom filter data is sequentially written to a log digest area in the flash. Correspondingly, in step S104, when the Bloom filter data is sequentially written to the log digest area in the flash, the Bloom filter data is firstly written to a buffer page in the memory corresponding to the log digest area, and when the buffer page in the memory is full, the contents of the buffer page are written to the log digest area in the flash. Furthermore, the firstly writing the Bloom filter data to the buffer page in the memory corresponding to the log digest area and then writing contents of the buffer page in the memory to the log digest area in the flash when the buffer page is full may be realized as follows.

Each Bloom filter data in a page of a log digest buffer area is divided into four segments, and the first to fourth data segments of each Bloom filter data are respectively sequentially written to four physical pages of the log digest area in the flash column by column until the four physical pages are full.

Each sector contained in each of the four physical pages is further divided into four segments, and the first to fourth data segments of each sector are respectively sequentially written to four new physical pages of the log digest area in the flash column by column until the new physical pages are full, and such operations are repeatedly performed, until each bit of the Bloom filter data in the log digest buffer area is respectively written to a different physical page of the log digest area in the flash.

FIGS. 2.1 to 2.3 are schematic views of stages in an operation of writing Bloom filter data to a log digest area in a flash according to the present invention. Specifically, it is assumed that a Bloom filter data has m bits, and in this embodiment, the m bits in the Bloom filter data are intended to be respectively stored in m physical pages, that is, the $i^{th}$ bit is stored in the $i^{th}$ physical page. When the Bloom filter data is written to the log digest area, the Bloom filter data is firstly stored in a buffer area (SLA buffer) in the memory corresponding to the log digest area. When the SLA buffer area is full, the Bloom filter data in the buffer area is written to the flash. As data is continuously written to the SLA buffer area, the data in the flash is continuously reassembled. The basic concept of the reassembling operation is that, if one Bloom filter data is stored in P physical pages for the first time, the bits in [(i−1)*m/P,i*m/P) of the Bloom filter data are stored in the $i^{th}$ physical page. For example, the $1^{st}$ physical page stores the bits in [0, m/P) of the Bloom filter data. In this case, during the reassembling operation, as one physical page of the flash is generally constituted by four independent sectors, the data in each physical page is divided into four sectors during the reassembling operation, and then the data in the four sectors are respectively stored in four newly allocated physical pages, and such operations are repeatedly performed, until m bits of the Bloom filter data are respectively stored in m physical pages. The details may be obtained with reference to FIGS. 2.1 to 2.3.

As shown in FIG. 2.1, when an SLA buffer area is full (in FIG. 2.1, one SLA buffer page is taken as an example, and one SLA buffer page contains 4 Bloom filters), and the Bloom filters in the buffer area are written to the flash, each Bloom filter in the SLA buffer area is firstly divided into four blocks, and four physical pages are allocated for storing the Bloom filters in the SLA buffer area. Specifically, the first blocks of the four Bloom filters are written to the first sector of the first physical page. Considering a writing method, the data is written column by column, that is, the first bit of each Bloom filter, is written first, and then the second bit thereof is written subsequently, and so on, as shown in FIG. 2.1. After the Bloom filters are written to the flash, the data in the SLA buffer area is cleared. When the SLA buffer area gets full for a second time, four Bloom filters are respectively written to the second sectors of the four physical pages column by column, and such operations are repeatedly performed. After the four physical pages are full, the step shown in FIG. 2.2 is performed.

As shown in FIG. 2.2, the four full physical pages in FIG. 2.1 are reassembled. In a reassembling method, the data in the four pages is read into the memory, and then written back to the flash. In a writing method, the data in each physical page is written to four newly allocated physical pages, for example, the data in the first page is written to newly allocated [1, 4] pages. Specifically, each sector of one physical page is further divided into four blocks, each block is written to a sector of the four new pages, and so on. The data is also organized and written column by column, which is the same as the first step. As such, the log digest area in the flash becomes 16 new physical pages, that is, physical pages as shown in FIG. 2.2, and data in each physical page is from a block of the physical pages in the first step. The four physical pages in the first step are taken as trash to be recycled. When data is continuously written, the operations are repeatedly performed until the 16 physical pages are full.

When all the physical pages in FIG. 2.2 are full, the reassembling operation is performed, as shown in FIG. 2.3. In a reassembling method, data in each physical page is written to four new physical pages column by column. The process is consistent with that in FIG. 2.2. Then, the operations are repeatedly performed, until m physical pages are obtained, that is, the data of m bits of the Bloom filter is respectively stored in m physical pages.

Preferably, after step S104, the method according to this embodiment further includes the following step.

In step S106, a physical address of data to be deleted in the data recording area is sequentially written to a data deletion area in the flash. In practice, this step is optional.

Preferably, after step S106, the method according to this embodiment further includes the following step.

In step S108, update data adapted to replace the deleted data is sequentially written to the data recording area in the flash. Then, the process proceeds to step S102. In practice, this step S108 is optional.

In this embodiment of the present invention, a flash storage structure including a data recording area, a log area, and a log digest area is adopted, thereby reducing the occupied storage space of the flash. In addition, since all the areas adopt a sequential storage mode, the data maintenance is quite simple. Meanwhile, as the log digest is stored in a form of Bloom filter data, the data query efficiency is improved.

Figure 3:
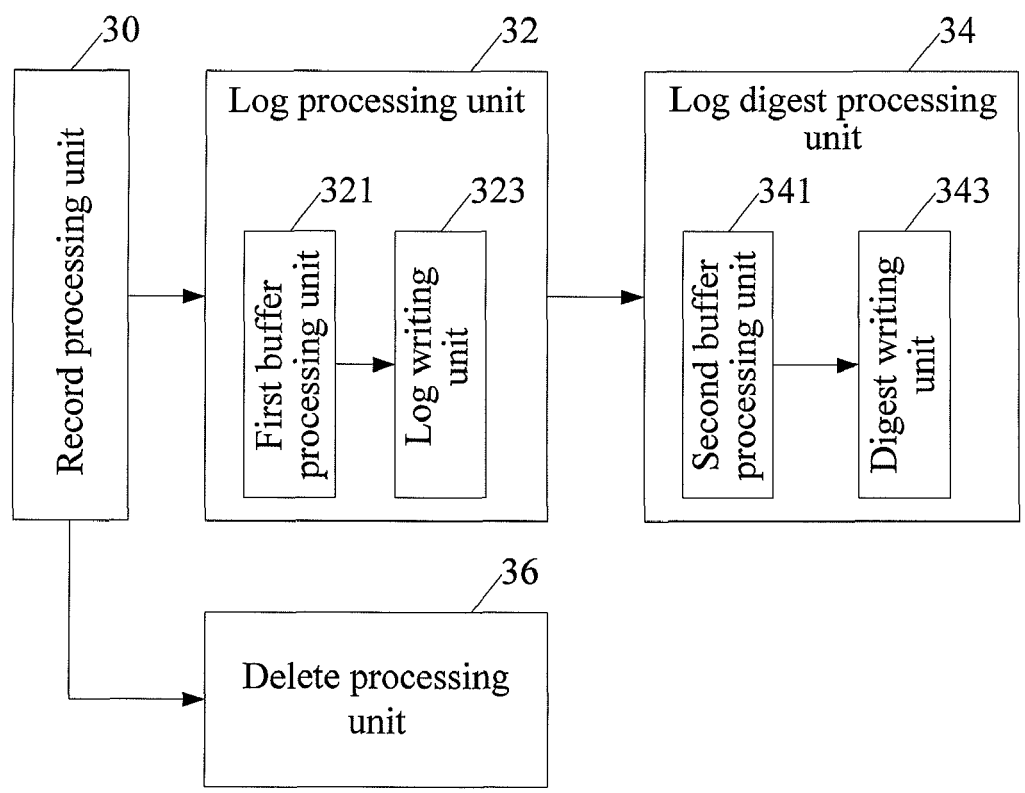
FIG. 3 is a schematic structural view of a data storage processing device according to an embodiment of the present invention.

Correspondingly, in an embodiment, the present invention provides a data storage processing device, which is applicable to perform the data storage processing method. FIG. 3 is a schematic structural view of a data storage processing device according to an embodiment of the present invention. Referring to FIG. 3, the device of this embodiment at least includes a record processing unit 30, a log processing unit 32, and a log digest processing unit 34.

The record processing unit 30 is adapted to sequentially write data to a data recording area in a flash.

The log processing unit 32 is adapted to generate log information according to a physical address of the data in the data recording area and an ID of the data, and sequentially write the log information to a log area in the flash. Still referring to FIG. 3, the log processing unit 32 further includes a first buffer processing unit 321 and a log writing unit 323.

The first buffer processing unit 321 is adapted to generate the log information according to the physical address of the data in the data recording area and the ID of the data, and store the log information in a log buffer area in a memory.

The log writing unit 323 is adapted to sequentially write the log information in the log buffer area to the log area in the flash.

The log digest processing unit 34 is adapted to construct a Bloom filter data for the log information in the log area, and sequentially write the Bloom filter data to a log digest area in the flash. Still referring to FIG. 3, the log digest processing unit 34 further includes a second buffer processing unit 341 and a digest writing unit 343.

The second buffer processing unit 341 is adapted to construct the Bloom filter data for the log information in the log area, and store the Bloom filter data in a log digest buffer area in the memory.

The digest writing unit 343 is adapted to sequentially write the Bloom filter data in the log digest buffer area to the log digest area in the flash. Specifically, the digest writing unit 343 divides each Bloom filter data in a page of the log digest buffer area into four segments, and respectively sequentially writes the first to fourth data segments of each Bloom filter data to four physical pages of the log digest area in the flash column by column until the four physical pages are full, and then further divides each sector in each of the four physical pages into four segments, and respectively sequentially writes the first to fourth data segments in each sector to four new physical pages of the log digest area in the flash column by column until the new physical pages are full, and repeatedly performs such operations, until each bit of each Bloom filter data in the log digest buffer area is respectively written to a different physical page of the log digest area in the flash.

Preferably, the device according to this embodiment further includes a delete processing unit 36.

The delete processing unit 36 is adapted to sequentially write a physical address of data to be deleted in the data recording area to a data deletion area in the flash. In practice, the delete processing unit 36 is optional.

Preferably, the record processing unit 30 of this embodiment further sequentially writes update data adapted to replace the data deleted by the delete processing unit 36 to the data recording area in the flash. In practice, this function of the record processing unit 30 is optional.

In this embodiment of the present invention, a flash storage structure including a data recording area, a log area, and a log digest area is adopted, thereby reducing the occupied storage space of the flash. In addition, since all the areas adopt a sequential storage mode, the data maintenance is quite simple. Meanwhile, as the log digest is stored in a form of Bloom filter data, the data query efficiency is improved.

Figure 4:
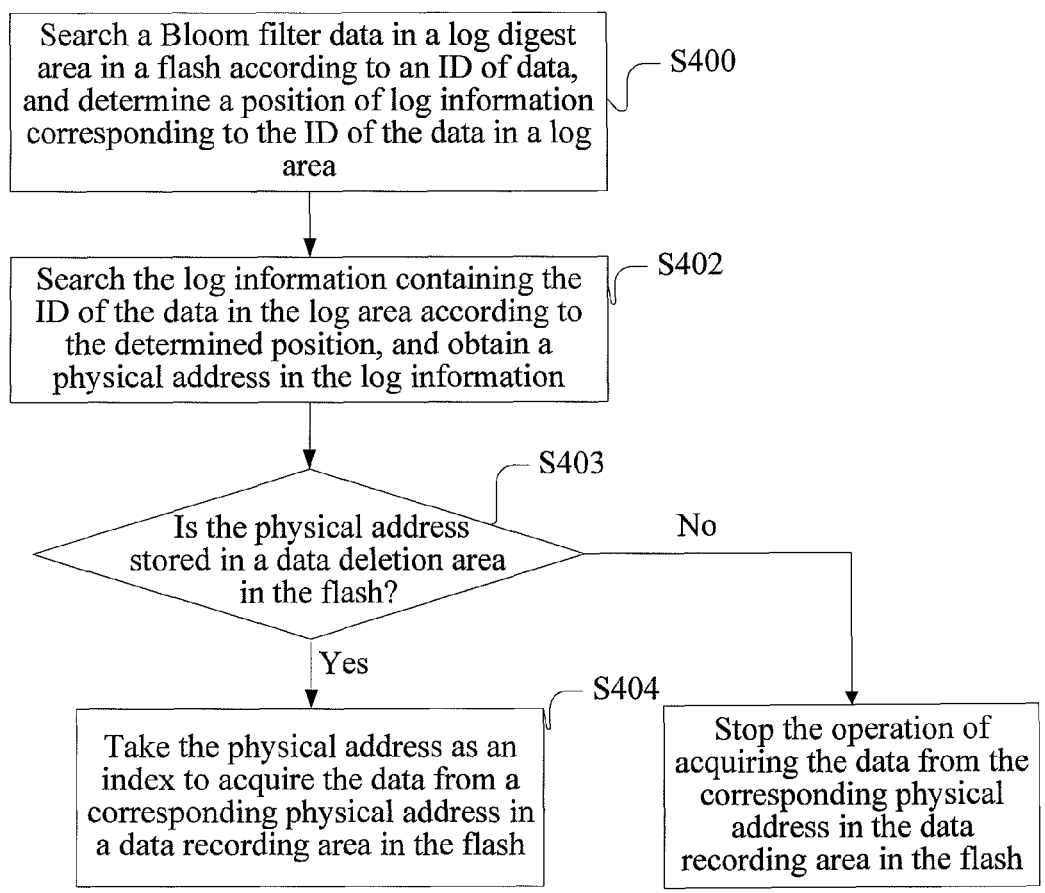
FIG. 4 is a schematic flow chart of a data searching method according to an embodiment of the present invention.

Correspondingly, in an embodiment, the present invention provides a data searching method corresponding to the data storage processing method. FIG. 4 is a schematic flow chart of a data searching method according to an embodiment of the present invention. Referring to FIG. 4, the method according to this embodiment includes the following steps.

In step S400, a Bloom filter data in a log digest area in a flash is searched according to an ID of data, and a position of log information corresponding to the ID of the data in a log area is determined according to the obtained Bloom filter data. The ID of the data is adapted to uniquely identify the data, and specifically, the ID of the data may be a key value. Specifically, in step S400, a second Bloom filter data is calculated by using the ID of the data and a plurality of hash functions. The second Bloom filter data includes a plurality of Bloom filter data. The Bloom filter data in the log digest area is traversed to determine whether a first Bloom filter data with all bits indicated by the second Bloom filter data being 1 exists or not, and if yes, the position of the log information corresponding to the ID of the data in the log area is determined according to the first Bloom filter data.

As described in the data storage processing method, in the log digest area, m bits in one Bloom filter data are respectively stored in m physical pages. Now, it is assumed that k hash functions are provided for constructing the second Bloom filter data, and Key is a key value corresponding to the log information to be searched. The k hash functions are used to calculate k second Bloom filter data corresponding to Key, including h1 (Key), h2 (Key), ..., hk (Key). Then, a first Bloom filter data with bits at positions indicated by h1 (Key), h2 (Key), ..., hk (Key) being 1 is searched by traversing all Bloom filter data in the log digest area. If a Bloom filter data with bits at positions indicated by h1 (Key), h2 (Key), ..., hk (Key) being 1 is obtained (that is, the first Bloom filter data is obtained), a position of the log information containing the Key in the log area can be determined according to the first Bloom filter data. If no Bloom filter data with bits at positions indicated by h1 (Key), h2 (Key), ..., hk (Key) being 1 can be obtained among all the Bloom filter data, it indicates that the log information containing the Key does not exist.

In step S402, the log information containing the ID of the data is searched in the log area according to the determined position, and a physical address in the log information is obtained.

In step S404, the physical address is taken as an index to acquire the data from a corresponding physical address in a data recording area in the flash.

Preferably, before step S404, the method according to this embodiment further includes the following step.

In step S403, the physical address is taken as an index to determine whether the physical address is stored in a data deletion area in the flash or not.

If yes, the operation of acquiring the data from the corresponding physical address in the data recording area in the flash is stopped.

If not, step S404 is performed, and the physical address is taken as an index to acquire the data from the corresponding physical address in the data recording area in the flash.

In this embodiment of the present invention, a flash storage structure including a data recording area, a log area, and a log digest area is adopted, thereby reducing the occupied storage space of the flash. In addition, since all the areas adopt a sequential storage mode, the data maintenance is quite simple. Meanwhile, as the log digest is stored in a form of Bloom filter data, the data query efficiency is improved.

Figure 5:
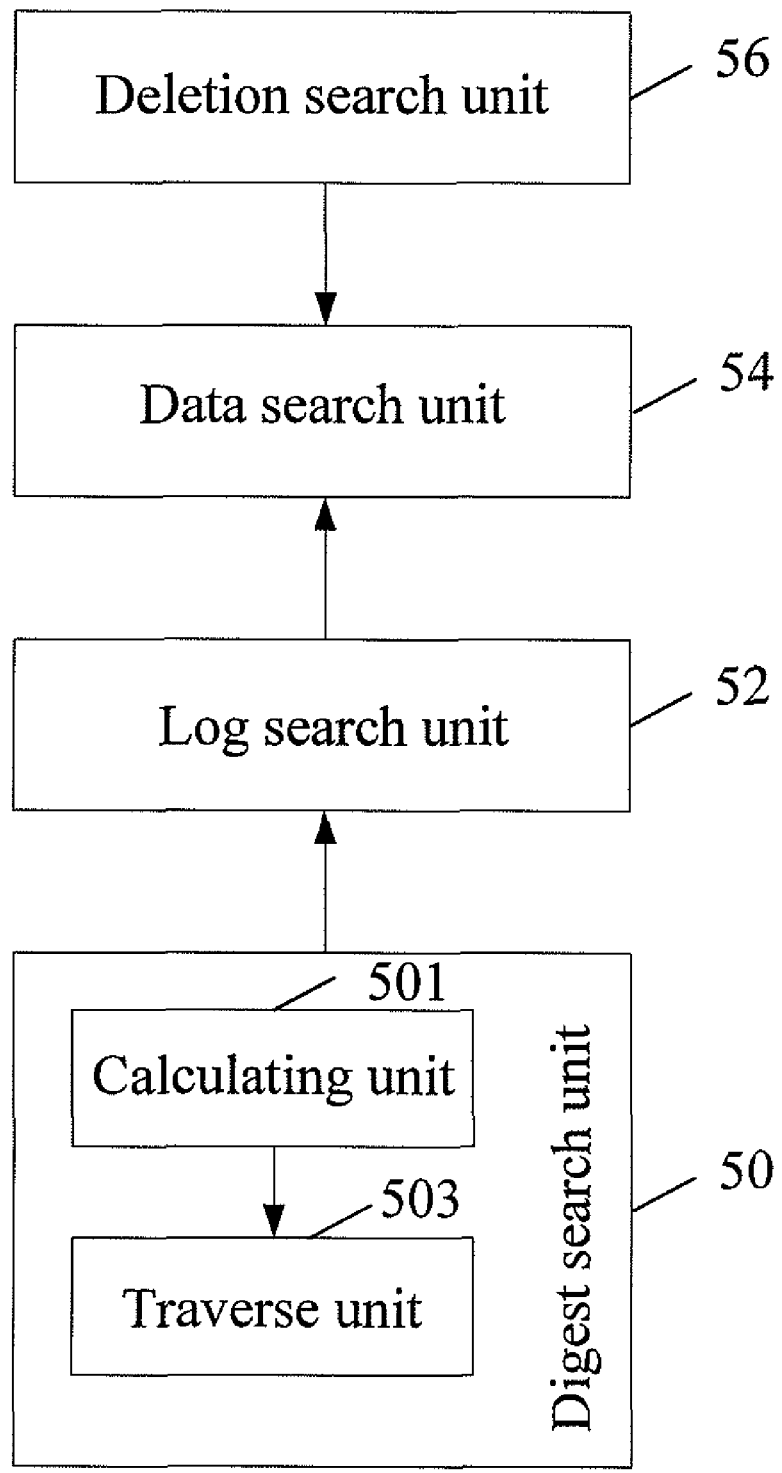
FIG. 5 is a schematic structural view of a data searching device according to an embodiment of the present invention.

Correspondingly, in an embodiment, the present invention provides a data searching device, which is applicable to perform the data searching method. FIG. 5 is a schematic structural view of a data searching device according to an embodiment of the present invention. Referring to FIG. 5, the device according to this embodiment at least includes a digest search unit 50, a log search unit 52, and a data search unit 54.

The digest search unit 50 is adapted to search a Bloom filter data in a log digest area in a flash according to an ID of data, and determine a position of log information corresponding to the ID of the data in a log area according to the obtained Bloom filter data. Still referring to FIG. 5, the digest search unit 50 further includes a calculating unit 501 and a traverse unit 503.

The calculating unit 501 is adapted to calculate a second Bloom filter data by using the ID of the data and a plurality of hash functions. The second Bloom filter data includes a plurality of Bloom filter data.

The traverse unit 503 is adapted to traverse the Bloom filter data in the log digest area to determine whether a first Bloom filter data with all bits indicated by the second Bloom filter data being 1 exists or not, and if yes, determine the position of the log information corresponding to the ID of the data in the log area according to the first Bloom filter data. Specifically, the traverse unit 503 sequentially extracts each bit of one Bloom filter data from different physical pages. The traverse unit 503 extracts one bit for each time, and determines whether the bit is 1 or not if the bit is at a position indicated by the second Bloom filter data, and if yes, the traverse unit 503 continues to extract a next bit of the current Bloom filter data. After traversing one Bloom filter data, the traverse unit 503 traverses a next Bloom filter data in the same manner. The operations are repeatedly performed until all Bloom filter data in the log digest area is traversed.

The log search unit 52 is adapted to search the log information containing the ID of the data in the log area according to the determined position, and obtain a physical address in the log information.

The data search unit 54 is adapted to take the physical address as an index to acquire the data from a corresponding physical address in a data recording area in the flash.

Preferably, the data searching device according to this embodiment further includes a deletion search unit 56.

The deletion search unit 56 is adapted to take the physical address as an index to determine whether the physical address is stored in a data deletion area in the flash or not.

If yes, the deletion search unit 56 stops the operation of acquiring the data from the corresponding physical address in the data recording area in the flash.

If not, the deletion search unit 56 notifies the data search unit 54 to take the physical address as an index to acquire the data from the corresponding physical address in the data recording area in the flash. In practice, the deletion search unit 56 is optional.

In this embodiment of the present invention, a flash storage structure including a data recording area, a log area, and a log digest area is adopted, thereby reducing the occupied storage space of the flash. In addition, since all the areas adopt a sequential storage mode, the data maintenance is quite simple. Meanwhile, as the log digest is stored in a form of Bloom filter data, the data query efficiency is improved.

It should be noted that, through the above description of the embodiments, it is apparent to persons skilled in the art that the present invention may be accomplished by software together with a necessary hardware platform, and definitely may also be accomplished by hardware. Therefore, all or a part of the technical solutions of the present invention that makes contributions to the prior art can be embodied in the form of a software product. The computer software product may be stored in a storage medium such as a read-only memory (ROM) or a random access memory (RAM), a magnetic disk, or an optical disk, and contain several instructions to instruct computer equipment (for example, a personal computer, a server, or network equipment) to perform the method as described in the embodiments of the present invention or in some parts of the embodiments.

The above descriptions are merely some exemplary embodiments of the present invention, but not intended to limit the scope of the present invention. Any equivalent variation made according to the claims of the present invention shall fall within the scope of the present invention.

What is claimed is:

1. A data storage processing method, comprising:
sequentially writing data to a data recording area in a flash;
generating log information according to a physical address of the data in the data recording area and an ID of the data, and sequentially writing the log information to a log area in the flash; and constructing a Bloom filter data for the log information in the log area, and sequentially writing the Bloom filter data to a log digest area in the flash.

2. The processing method of claim 1, wherein the generating a log information according to a physical address of the data in the data recording area and an ID of the data and sequentially writing the log information to a log area in the flash comprises:

generating the log information according to the physical address of the data in the data recording area and the ID of the data, and storing the log information in a log buffer area in a memory; and sequentially writing the log information in the log buffer area to the log area in the flash.

3. The processing method of claim 1, wherein the constructing a Bloom filter data for the log information in the log area, and sequentially writing the Bloom filter data to a log digest area in the flash comprise:

constructing the Bloom filter data for the log information in the log area, and storing the Bloom filter data in a log digest buffer area in the memory; and sequentially writing the Bloom filter data in the log digest buffer area to the log digest area in the flash.

4. The processing method of claim 3, wherein the sequentially writing the Bloom filter data in the log digest buffer area to the log digest area in the flash comprises:

dividing each Bloom filter data in a page of the log digest buffer area into four segments, and respectively sequentially writing the first to fourth data segments of each Bloom filter data to four physical pages of the log digest area in the flash column by column until the four physical pages are full; and dividing each sector in each of the four physical pages into four segments, and respectively sequentially writing the first to fourth data segments in each sector to four new physical pages of the log digest area in the flash column by column until the new physical pages are full, and repeatedly performing such operations, until each bit of each Bloom filter data in the log digest buffer area is respectively written to a different physical page of the log digest area in the flash.

5. A data storage processing device, comprising:

a record processing unit, adapted to sequentially write data to a data recording area in a flash;

a log processing unit, adapted to generate log information according to a physical address of the data in the data recording area and an ID of the data, and sequentially write the log information to a log area in the flash; and a log digest processing unit, adapted to construct a Bloom filter data for the log information in the log area, and sequentially write the Bloom filter data to a log digest area in the flash.

6. The device of claim 5, wherein the log processing unit comprises a first buffer processing unit, and a log writing unit, wherein:

the first buffer processing unit is adapted to generate the log information according to the physical address of the data in the data recording area and the ID of the data, and store the log information in a log buffer area in a memory; and the log writing unit is adapted to sequentially write the log information in the log buffer area to the log area in the flash.

7. The device of claim 6, wherein the log digest processing unit comprises a second buffer processing unit, and a digest writing unit, wherein:

the second buffer processing unit is adapted to construct the Bloom filter data for the log information in the log area, and store the Bloom filter data in a log digest buffer area in the memory; and the digest writing unit is adapted to sequentially write the Bloom filter data in the log digest buffer area to the log digest area in the flash.

8. The device of claim 7, wherein the digest writing unit is adapted to:

divide each Bloom filter data in a page of the log digest buffer area into four segments, and respectively sequentially write the first to fourth data segments of each Bloom filter data to four physical pages of the log digest area in the flash column by column until the four physical pages are full; and divide each sector in each of the four physical pages into four segments, and respectively sequentially write the first to fourth data segments in each sector to four new physical pages of the log digest area in the flash column by column until the new physical pages are full, and repeatedly perform such operations, until each bit of each Bloom filter data in the log digest buffer area is respectively written to a different physical page of the log digest area in the flash.

9. A data searching device, comprising:

a digest search unit, adapted to search a Bloom filter data in a log digest area in a flash according to an ID of data, and determine a position of log information corresponding to the ID of the data in a log area according to the obtained Bloom filter data;

a log search unit, adapted to search the log information containing the ID of the data in the log area according to the determined position, and obtain a physical address in the log information; and a data search unit, adapted to take the physical address as an index to acquire the data from a corresponding physical address in a data recording area in the flash.

10. The device of claim 9, wherein digest search unit comprises a calculating unit, and a traverse unit; wherein:

the calculating unit is adapted to calculate a second Bloom filter data by using the ID of the data and a plurality of hash functions, and the second Bloom filter data comprises a plurality of Bloom filter data; and the traverse unit is adapted to traverse the Bloom filter data in the log digest area to determine whether a first Bloom filter data with all bits indicated by the second Bloom filter data being 1 exists or not, and if a first Bloom filter data with all bits indicated by the second Bloom filter data being 1 exists, determine the position of the log information corresponding to the ID of the data in the log area according to the first Bloom filter data.

11. The device of claim 10, wherein the traverse unit is adapted to:

sequentially extract each bit of one Bloom filter data from different physical pages, when extracts one bit for each time, and determine whether the bit is 1 or not if the bit is at a position indicated by the second Bloom filter data, and if yes, and extracting a next bit of the current Bloom filter data; and traverse next Bloom filter data in the same manner after traversing one Bloom filter data until all Bloom filter data in the log digest area is traversed.

12. A storage device, comprising:
a data recording area, configured to storage data being sequentially written;
a log area, configured to storage log information being sequentially written, wherein the log information is generated according to a physical address of the data in the data recording area and an ID of the data; and
a log digest area, configured to storage Bloom filter data being sequentially written, wherein the Bloom filter data is constructed for the log information in the log area.

* * * * *